United States Patent [19]
Clark

[11] Patent Number: 5,730,257
[45] Date of Patent: Mar. 24, 1998

[54] METHOD OF MANUFACTURING A FRICTION MEMBER

[75] Inventor: Neil Jason Clark, Granger, Ind.

[73] Assignee: Robert Bosch Technology Corporation, Broadview, Ill.

[21] Appl. No.: 625,388

[22] Filed: Apr. 1, 1996

Related U.S. Application Data

[62] Division of Ser. No. 399,062, Mar. 8, 1995, Pat. No. 5,561,895.
[51] Int. Cl.$^6$ ............................................ F16F 69/04
[52] U.S. Cl. ............... 188/73.1; 188/73.37; 188/250 E; 188/250 G
[58] Field of Search .................. 188/250 G, 73.1, 188/250 B, 250 E, 250 A, 218 A, 218 R, 218, 73.2, 73.37, 264 G; 192/70.13, 107 R; 29/467, 894

[56] References Cited

U.S. PATENT DOCUMENTS 4,705,146  11/1987  Tarter ........................................ 188/73.1

*Primary Examiner*—Douglas C. Butler
*Attorney, Agent, or Firm*—Leo H. McCormick, Jr.

[57] ABSTRACT

A brake pad (10) having a mechanical joint formed between a friction member (22) and a metal backing plate (12) by a plurality of rivets (30,30' ... 30"). Each rivet (30) has a head (36) and an end (37) with the head (36) engaging the friction member (22) and the end (37) engaging the backing plate (12). During assembly of each rivet (30) with the backing plate (22), a force is applied to the head (36) causing the end (37) to flow in a groove (38) in a die (16) and form a flattened surface. The amount of the force applied to head (36) is limited to create a clamping force between the head and backing plate which holds the friction member (22) against the backing plate (12) and yet noise developed through vibration during a brake application is attenuated as the friction member (22) and metal backing plate (12) vibrate at different frequencies.

3 Claims, 2 Drawing Sheets

U.S. Patent  Mar. 24, 1998  Sheet 1 of 2  5,730,257
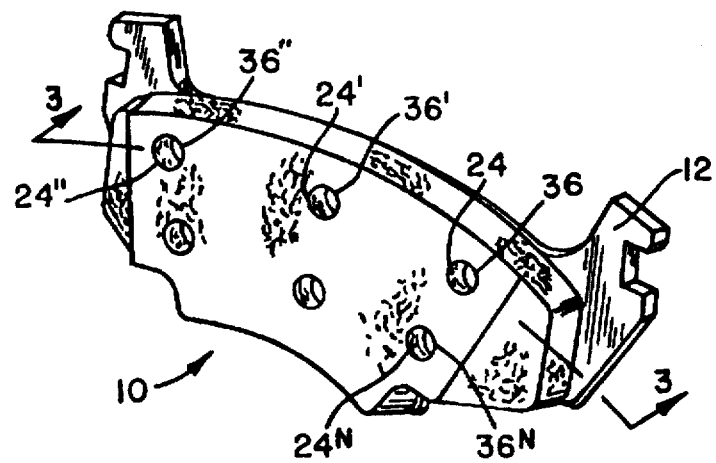
FIG. 1
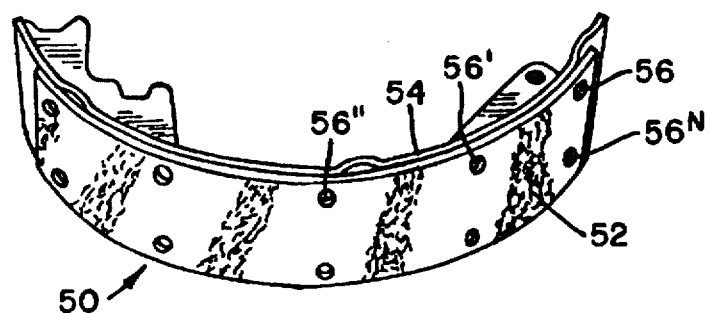
FIG. 2
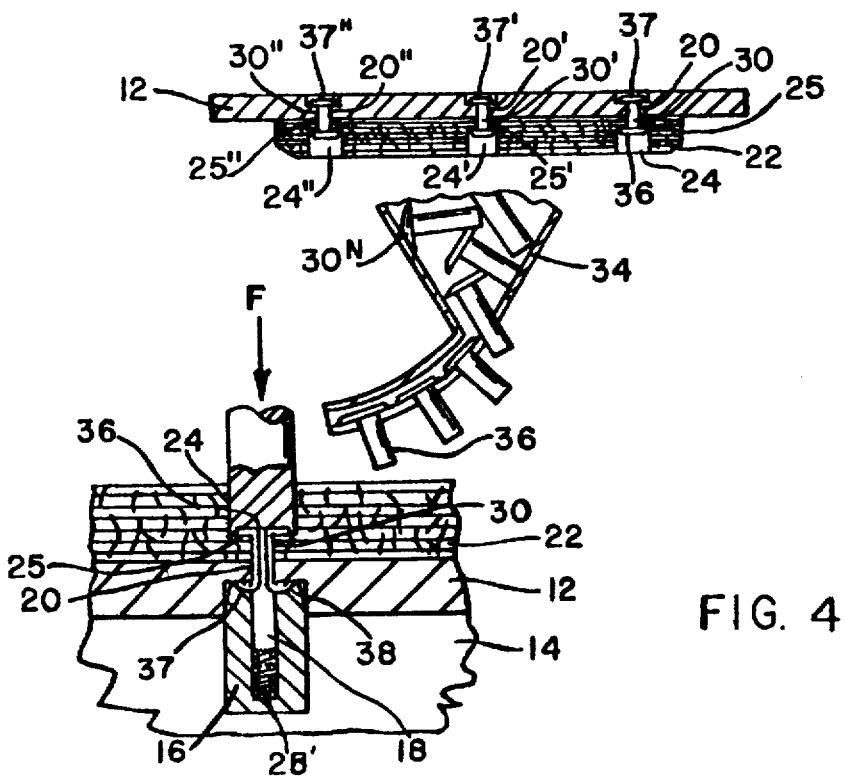
FIG. 3
FIG. 4

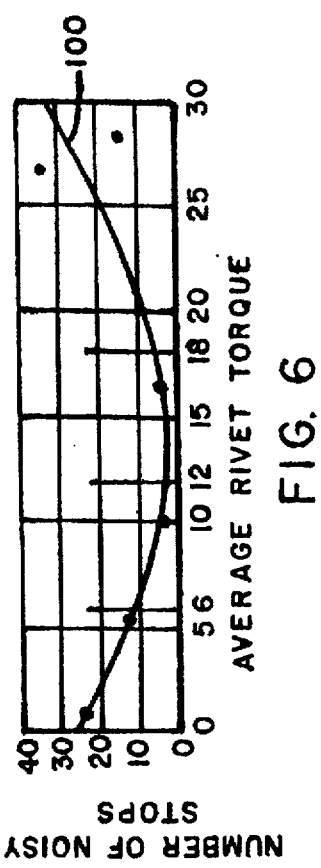
FIG. 6
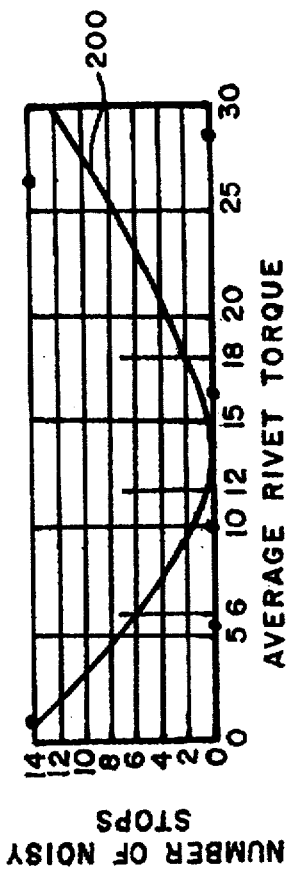
FIG. 7
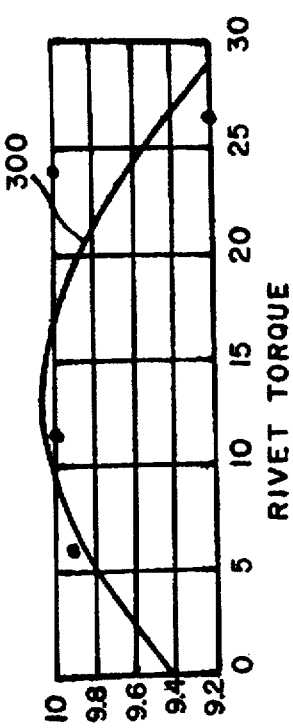
FIG. 9
| SAMPLE | AVERAGE RIVET TORQUE | #NOISY STOPS | MODIFIED #NOISY STOPS |
|---|---|---|---|
| A | 5.2 | 12 | 0 |
| B | 26.8 | 35 | 14 |
| C | — | 23 | 14 |
| D | 16 | 5 | 0 |
| E | 10 | 5 | 0 |
| F | 28 | 14 | 0 |
FIG. 5
| SAMPLES | AVERAGE RIVET TORQUE | NOISE RATING |
|---|---|---|
| G | 23.7 | 10 |
| H | 10.6 | 10 |
| I | 11 | 10 |
| J | 27 | 9.2 |
| K | 6 | 9.9 |
FIG. 8

METHOD OF MANUFACTURING A FRICTION MEMBER

This application is a division of application Ser. No. 08/399,062, filed Mar. 8, 1995, now U.S. Pat. No. 5,561,895.

This invention relates to a method of manufacturing a brake pad wherein a friction member and backing plate attenuate noise generated during a brake application.

BACKGROUND OF THE INVENTION

Attempts have been made to reduce or mask noise generated during a brake application such as through: the application of a sound coating on backing plates as disclosed in U.S. Pat. No. 3,998,301; the location of a screen member between the friction member and backing plate as disclosed in U.S. Pat. No. 4,154,322; the use of discrete friction members as disclosed in U.S. Pat. No. 4,315,563 and U.K. Patent 2148424A; the selection of the shape of a friction pad such that its engagement surface is less than the nodal diameter of a frequency that would create undesirable noise as disclosed in U.S. Pat. Nos. 4,705,146 and 5,145,037; and the modification of ingredients in the friction material. Such methods and/or structure to reduce noise have not been widely accepted by the automobile industry primarily because of the added cost associate for such brake systems.

It is known that most structures vibrate and such vibration is often the result of dynamic forces applied to such structures which can create noise. If the vibration of the structures is in a frequency domain which is not audible, most individuals are not conscience aware of the occurrence of such vibration. However, such vibration can be measured and an analysis of such vibration can be evaluated as a product of the structure response spectrum and the spectrum of an applied dynamic force through frequency response analysis. Most often the structure response is studied through modal analysis wherein modal parameters of the structure (natural frequencies, modal damping and mode shapes) are identified and ultimately a modal model of the structure is constructed based on these modal parameters. From experimentation, it has been determined that noise is generated in all brake systems during each brake application, however only audible noise is objectionable to most drivers.

SUMMARY OF THE INVENTION

To evaluate noise associated with brake systems which include a caliper, associated brake pads and a rotor, tests were developed and high frequency noise was observed during braking as performed in conjunction with a dynamometer. Modal analysis and frequency response analysis have been developed for the brake systems to determine the natural frequencies of noise generated during a brake application. It was observed that the individual components of the brake system did not have the same natural frequency but most contributed to the overall development of noise. It is known that noise produced by vibrations could be canceled in a brake system if the frequency of vibration of components of equal components are out of synchronization by 180 degrees. However, from our analyses it was determined that it may not be possible or feasible to develop such cancellation vibration but a change in the clamping force, which holds a friction material to the backing plate of the brake pads, would change or attenuate the development of audible brake noise for a brake system since these components could not now vibrate independently or non-synchronously and not as a unitary structure.

It is an object of this invention to provide a method of manufacturing a brake pad by controlling the clamping force which holds a friction material to a backing plate to modify a frequency path through which vibrations may be communicated during a brake application and as a result attenuation of noise.

It is a further object of this invention to provide a method of attenuation of noise created during a brake application by modifying the clamping force between a friction material and a backing plate such that each vibrates with an individual frequency rather than a frequency of a solid member.

These objects should be apparent from reading this specification while viewing the drawings.

BRIEF DESCRIPTION OF THE DRAWINGS

FIG. 1 is a schematic illustration of a friction pad for use in a disc brake assembly wherein the friction material is attached to the backing plate in accordance with the method disclosed by the present invention;

FIG. 2 is a schematic illustration of a friction pad for use in a drum brake assembly wherein the friction material is attached to the backing plate in accordance with the method disclosed by the present invention;

FIG. 3 is a sectional view of the friction pad of FIG. 1;

FIG. 4 is a schematic illustration of a station in a manufacturing process wherein a friction material as illustrated in FIG. 1 is attached to a backing plate;

FIG. 5 is a table identifying rivet torque and the number of noisy stops identified during an evaluation of various brake pads tested on a dynamometer;

FIG. 6 is a graph comparing dynamometer brake noise with rivet torque for the brake pads identified in FIG. 5;

FIG. 7 is a graph comparing dynamometer brake noise with rivet torque based for brake pads identified in FIG. 5 with certain frequency noises excluded from the comparison;

FIG. 8 is a table showing rivet torque and the number of noisy stops identified during an evaluation of various brake pads tested on a vehicle; and FIG. 9 is a graph rating noise with rivet torque as observed by a driver during a city driving test on a vehicle.

DETAILED DESCRIPTION OF THE INVENTION

Heretofore it was common practice in the manufacture of a brake pad to attach a friction material to a backing plate such that a unitary structure was produced. Such attachment being achieved through either a chemical bonding process or mechanical bonding through riveting. In the chemical bonding process, a cured phenolic material forms an adhesive through which a friction material is attached to a metal backing plate. Chemical bonding requires some type of oven wherein the curing of the phenolic takes place over a period of time. If a good chemical bond is not achieved, forces created during a brake application can separate the friction material from the metal backing plate and as a result for some brake systems, a mechanical bond may be specified to assure that such separation does not occur. In order to assure that a strong mechanical bond is produced, it is common practice to specify that a rivet torque of up to 35 pound-inches is developed to create a mechanical bond to create a resulting unitary structure. In addition, customers may accept mechanical bonding since brake pads may be less costly than brake pads manufacture by chemical bonding since pressing equipment is often less costly than a curing oven.

In a project relating to the study of noise created during a brake application, a brake pad having a friction material attached thereto by a mechanical bond created by riveting was tested by a dynamometer to simulate performance in a brake system. Through such testing, audible frequencies noise created during a brake application was measured and recorded and retained. The noise testing included a series of stops from a set speed, at a fixed deceleration rate and temperature and in particular the following specific tests were performed: Burnish stops (200 stops all from 40 MPH at 10 ft/sec$^2$ and 200° F.); First Noise Evaluation Matrix stops (156 total stops all from 25 MPH with 39 stops at 75 psi, 39 stops at 150 psi, 39 stops at 300 psi and 39 stops at 400 psi, and temperature variances of 50° F. from 150° F. to 450° F., respectively); First city traffic simulation stops (50 snubs 30–15 Mph at 6 ft/sec at 250° F.; 50 snubs 30-15 Mph at 6 ft/sec at 350° F.; 20 snubs 30-15 Mph at 6 ft/sec at 500° F.;.25 stops 40-1 Mph at 6 ft/sec at 550° F.; 25 stops 40-1 Mph at 6 ft/sec at 500° F.; and 50 stops 40-1 Mph at 6 ft/sec at 350° F.); Second Noise Evaluation Matrix stops (Repeat to same sequence of the First Noise Evaluation Matrix); Second city traffic simulation stops (Repeat the sequence of the First city traffic simulation); and Third Noise Evaluation Matrix (Repeat the same sequence of the First Noise Evaluation Matrix). The amplitude for noise was measured, recorded and stored in a computer during each brake application in this particular test sequence. From an analysis and evaluation of the stored noise, it was determined that as long as the audible level is below 85 dB during any one stop in the series of stops, noise is not considered to be a problem.

To simulate noise for further evaluation and analysis, a brake pad for use in a brake system was excited by either striking a test fixture which retained the brake pad with an instrumented hammer. A frequency response analysis was performed on the brake system by using modal analysis as a result of the input excitation to determine the noise frequencies generated during a brake application. A dual channel Fast Fourier Transform analyzer is used in such modal analysis to measure the ratio of the response to a measured input excitation. The transfer of motion between the input to the output was recorded for a series of tests. This transfer function is a complex function and has both a real and imaginary component in the output which is best analyzed through the use of a computer. Commercialized modal analysis software packages are available and for this analysis a program entitled "CAEDS", purchased from IBM, was used to extract the modal parameters of the pad from the transfer functions to establish a pad modal model corresponding to noise frequency response.

To better understand the effect of the mechanical bond between a friction member and a backing plate of a brake pad in the development of noise created during a brake application, a plurality of brake pad 10 shown in FIG. 1 were manufactured in accordance with a process illustrated in FIG. 4. In this process, a backing plate 12 is placed on die 16 extending from fixture 14. Die 16 has a guide pin 18 that extends through holes 20,20' . . . 20" in backing plate 12. A friction material 22 is placed on top of the backing plate 12 with holes 24, 24' . . . 24" in the friction material 22 aligned with holes 20, 20' . . . 20" in the backing plate 12 by guide pin 18. Guide pin 18 at this stage in the process essentially extends through the friction material 22 as a result of a resilient force exerted on the guide pin 18 by spring 24 caged in die 16. Rivets 30, 30' . . . 30" located in storage container 34 are placed on guide pin 18 and a force applied to initially move the rivet 30 into engagement with die 14. As a force F is applied to the head 36 of the rivet 30 the bottom thereof 37 flows into an annular groove 38 in die 16 to form a flatten end and mechanically join the friction material 22 to the backing plate 12 as best shown in FIG. 3. After a rivet 30, 30' . . . 30" is located in holes 20, 20' . . . 20" and 24, 24' . . . 24" and flatten by the force F of the press, the friction material 22 and backing plate 12 define a unitary structure or a brake pad 10 as shown in FIG. 1.

Other methods for ways of joining a friction member 22 to a backing plate 12 by a rivets 30 other than applying a force F, include: a rolled rivet height control, lining segment torque (measuring the torque to spin a 1 inch square lining to a backing plate segment with one rivet) and pressure riveting to control the pressure supplied to a riveter apparatus.

To substantiate the finding that modification of the mechanical bond or attachment between the friction material 22 and backing plate 12 would attenuate noise generated during braking, the force for heading end 37 of rivets 30, 30' . . . 30" was controlled and varied to produce a series of brake pads A–F. The series of brake pads A–F set forth in FIG. 5 were manufactured by varying the average force F applied to perform heading (flattening of end 37) of the rivets 30, 30' . . . 30". The testing sequence on a dynamometer, identified above, was performed with respect to each brake pad A–F and the number of noisy stops recorded. The number of noisy stops for the brake pads A–F obtained by such testing are listed in FIG. 5. The information obtained from the testing is plotted in FIG. 6 to develop curve 100. In the instant evaluation it was observed that primary noise was created by frequency in the 11 kHz range and secondary noise was created by frequency in 2 kHz range. Since the 2 kHz frequency is not considered to be objectionable, it was filtered out and the information recorded as modified noisy stops in FIG. 5 and plotted to develop curve 200 in FIG. 7. From curves 100 and 200 it has been concluded that for a brake pad 10 developed by a metal backing plate 12 and friction material 22, undesirable noise can be attenuated during a brake application by limiting rivet torque to a range of from 5 pound-inches to 20 pound-inches such that the backing plate 12 and friction material 22 vibrated at different frequencies, with a rivet torque of about 12 pound-inches being an optimum for the attenuation of noise.

To support the information obtained through dynamometer testing, brake pads G–K were manufactured having the clamping force between the friction material 22 and backing plate 12 by controlling the rivet torque as set forth in FIG. 8. Sets of these brake pads were sequentially installed on a vehicle and the vehicle was tested using a city traffic sequence for braking corresponding to the city braking as set forth with respect to the dynamometer testing. The noise was measured by the driver of the vehicle during the test sequence. This is a subjective test with a 1 being unacceptable and 10 being acceptable with substantially no objectionable noise developed or produced during a set within the brake test sequence. The results for brake pads G–K as set forth in FIG. 8 and the results plotted in FIG. 9 to produce curve 300. Curve 300 which is the inverse of curves 100 and 200 confirms that a clamping force between a friction material and backing plate effects the development of noise during a brake application and such noise may be attenuated by limiting the range of the rivet torque to between 5 pound-inches to 20 pound-inches.

The diameter and depth of holes 24, 24' . . . 24" in the friction material 22 are selected such that the clamping force developed between heads 36, 36' . . . 36" and flattened ends 37, 37' . . . 37" does not create any high stress points in the friction material 22.

In addition, it has been suggested openings or holes be placed in the heads 36, 36' ... 36" of rivets 30. When the friction material wears to a depth where the heads 36, 36' ... 36" engage a rotor, the noise that develops through such engagement provides an audible warning of a low wear conditions. The size of the holes could be changed to develop tuned noise frequencies for such warning.

The brake pad 50 shown in FIG. 2 is for use in a drum brake rather than brake pad 10 shown in FIG. 1 for use with a disc brake. The friction material 52 is attached to a metal backing plate 54 through a series of rivets 56, 56 ... 56". The force applied to head rivets 56, 56 ... 56" is controlled to limit the clamping force to the range indicated with respect to the evaluation of brake pad 10. Limited testing confirms a same level of attenuation of noise could be expected during a brake application with a brake pad manufactured in accordance with such limitations placed on the clamping force.

It is concluded by controlling rivet torque to a desired range wherein a friction member 22 and backing plate 12 wherein individual frequencies may occur, damping is attenuated as vibration energy is dissipated as heat is generated between the friction member 22 and backing plate 12. That is as the rivet torque is varied, the freedom of movement between the friction member 22 and backing plate 12 correspondingly changes such that heat is generated by friction that develops between the friction member 22 and backing plate 12.

I claim:

1. A brake pad having a friction member attached to a metal backing plate through a mechanical bond by a plurality of rivets means, the improvement comprising:

each rivet in said plurality of rivet means having a head and an end member, said each rivet extending through a first hole in said friction member and a second hole in said backing plate, said end member engaging an annular groove on a face of a die that engages said backing plate, said head being subjected to a force which causes said end to flow into said groove and thereafter engage said backing plate and define a clamping force between said head and backing plate for holding said friction member in engagement with said backing plate, said force be selected to limit the said clamping force to thereafter allow said friction member and metal backing plate to vibrate at different rates during a brake application and thereby attenuate the development of undesirable noise.

2. The brake pad as recited in claim 1 wherein said clamping force on each rivet of said rivet means is between 5-20 pound-inches.

3. The brake pad as recited in claim 1 wherein said clamping force of said rivet means is approximately 12 pound-inches.

* * * * *